United States Patent Office 3,415,673
Patented Dec. 10, 1968

3,415,673
COATED GLASS ARTICLE AND PROCESS FOR MAKING SAME
Gerald E. Clock, Midland, Mich., assignor to The Dow Chemical Company, Midland, Mich.
No Drawing. Filed Jan. 20, 1964, Ser. No. 338,633
6 Claims. (Cl. 117—72)

ABSTRACT OF THE DISCLOSURE

Glass containers such as bottles are made resistant to breakage by coating the exterior surface thereof with a thin, highly adhesive layer of plastic consisting essentially of a copolymer comprising, by weight, a major portion of ethylene and up to about 20 percent of an $\alpha,\beta$-ethylenically unsaturated carboxylic acid such as acrylic acid.

---

This invention relates to glass safety containers and more particularly, it relates to glass containers externally coated with a highly adhesive plastic material.

It is well known that glass containers are easily broken; however, they are commonly utilized to transport, store, and dispense various types of liquids. Glass containers are generally resistant and impervious to corrosive liquids and vapors and, because of such properties, are not replaceable by other materials such as plastic or metal. However, in using glass containers, there exists a disadvantage of possible breakage. Industries expend large sums of money to transport glass containers so as to minimize the chances of such breakage. Sawdust, woodchips, cloth, paper, and the like are used to pack said containers to make them suitable for shipping. These protective measures have not been entirely satisfactory. Coatings based on certain types of vinyl resins have been applied to the exterior surface of glass containers in an attempt to minimize glass deficiencies. While partially successful, even these coatings have shown problems such as insufficient adhesion, attack by product, and brittleness at low temperature.

It is an object of the present invention to provide a glass container in which liquids may be safely stored, transported, or dispensed. It is a further object to provide a glass container that will not shatter when dropped or suddenly contacted with a hard surface. A more specific object is to provide a glass container, the outer surface of which is coated with a highly adhesive plastic material, said container providing the advantages of glass alone and also providing additional advantages usually attributed to plastic containers. Various other objects, advantages, features, and variations of the invention will become apparent from the following description.

The above and other objects are accomplished in accordance with the present invention by coating the external surface of a glass container, such as a bottle, with a thin layer of a polymeric material comprising ethylene and an ethylenically unsaturated carboxylic acid. The glass surface may be pre-coated with materials such as polyethylene imine to provide a more adherent substrate for the copolymer. The container is dried and heated to a temperature of about 150° C. The polymer is applied to the external surface of the bottle by suitable means, such as by spraying. The bottle is subsequently heated to a temperature of about 175° C. to insure even distribution and adhesion of the copolymer coating on the surface of the bottle. The coated bottle may then be further coated, e.g. with a finishing varnish and baked for 10 to 15 minutes at a temperature from about 285° to 310° F. The finishing varnish gives the copolymer coating a hard outer surface which is highly resistant to scratching and marking.

The copolymer coating may be applied in various ways such as by means of a fluidized-bed, powder spray, electrostatic powder spray, flame spraying, or applying the polymer in a dispersion or emulsion. In most instances, it is desirable to pre-treat the glass surface with a material such as polyethylene imine to obtain a more adherent, moisture-resistant bond. The copolymer coating should be between about 0.002 and about 0.150 inch and preferably between about 0.005 and about 0.050 inch in thickness. The coating usually completely covers the container except for those areas of such articles with caps or covers, and then only up to the lower limits of the threads of the cap or cover.

The copolymer utilized in this invention comprises a major portion of ethylene and from about 2 to about 20 percent by weight based on the copolymer of an acidic comonomer selected from $\alpha,\beta$-ethylenically unsaturated mono- and polycarboxylic acids and acid anhydrides having from 3 to 8 carbon atoms per molecule and partial esters of such polycarboxylic acids wherein the acid moiety has at least one carboxyl group and the alcohol moiety has from 1 to 20 carbon atoms. Specific examples of such acidic comonomers are acrylic acid, methacrylic acid, crotonic acid, fumaric acid, maleic acid, itaconic acid, maleic anhydride, monomethyl maleate, monoethyl maleate, monomethyl fumarate, and monoethyl fumarate. The copolymers can be prepared by methods known to the art, for example, by polymerizing mixtures of ethylene and one or more of the specified acid comonomers at a pressure between 1000 and 3000 atmospheres and at temperatures from about 90° to 300° C. in the presence of peroxy catalysts.

The significant characteristic of the particular copolymer used in this invention is its excellent adhesive properties. When applied to the surfaces of a glass container, there is a lesser tendency for moisture and product penetration in the area between the copolymer coating and the glass. The adhesive copolymer has the further advantage of holding the glass "intact" if the container would happen to be dropped or subjected to a sudden blow, thereby, preventing shattering and eliminating the hazards of flying pieces of glass. The copolymer will not slip around or off the container after extended use as other coating currently being used often do. The coating will also serve the purpose of an emergency container when the inner glass has been broken. The coating will contain the liquid until it can be safely transferred to another container.

Dyes and fillers may be added to the copolymer to provide a variety of color combinations or other desired properties. For example, black copolymer coatings may be used to cover iodine reagent bottles, not only to protect the iodine from the light but also to protect the glass bottle against the possibility of being cracked or broken.

As an example of the invention, a clean small glass bottle was dip-coated with a 0.5 percent solution of polyethylene imine and dried. The bottle was then heated to about 210° C. for 10 minutes. A coating of ethylene-acrylic acid copolymer of about .010 inch thick was applied by means of an electrostatic powder spray gun. The coated bottle was then heated to a temperature of about 210° C. to insure even distribution and sufficient contact between the copolymer and the surface of the glass. The bottle was cooled, dip-coated with a finishing varnish material, and baked for 10 minutes at a temperature of about 150° C. The varnish overcoat provides a hard, scratch-resistant surface. After the bottle had sufficiently cooled, it was filled with water and dropped a distance of six feet onto a concrete floor. The internal glass bottle was broken into several pieces. However, the outer adhesive copolymer retained the pieces in place and completely contained the water.

What is claimed is:

1. An article of manufacture capable of storing a liquid or the like and capable of retaining said liquid upon fracture of at least one layer thereof, said article comprising a glass container having intimately adhered to the outer surface thereof a layer consisting essentially of a highly adhesive copolymer consisting of ethylene and between about 2 and about 20 percent by weight of an ethylenically unsaturated carboxylic acid.

2. An article according to claim 1 wherein the ethylenically unsaturated carboxylic acid is acrylic acid.

3. An article of manufacture according to claim 1 wherein the copolymer layer is of a thickness between about 0.002 and about 0.150 inch.

4. An article of manufacture according to claim 1 which includes an interlayer of polyethylene imine disposed between the outer surface of said glass container and said copolymer layer.

5. A process for producing a glass container capable of storing a liquid or the like and capable of retaining said liquid upon fracture of said glass which comprises the steps of coating the outer surface of a glass container with a film of polyethylene imine; drying said glass container; heating said glass container to a temperature of at least about 150° C. and thereafter applying a layer consisting essentially of a highly adhesive copolymer consisting of ethylene and between about 2 and about 20 percent by weight of an ethylenically unsaturated carboxylic acid; heating said glass container including said copolymer layer to a temperature of at least about 175° C.; and applying a varnish coating to the copolymer layer of said glass container to provide a hard, abrasion-resistant surface.

6. A process according to claim 5 wherein the ethylenically unsaturated carboxylic acid is acrylic acid.

References Cited

UNITED STATES PATENTS

| | | | |
|---|---|---|---|
| 2,716,612 | 8/1955 | Marks et al. | 117—72 X |
| 2,965,596 | 12/1960 | Sharf | 117—124 X |
| 2,983,700 | 5/1961 | Rohm | 117—161 X |
| 2,995,533 | 8/1961 | Parmer et al. | 117—124 X |
| 3,002,854 | 10/1961 | Brill | 117—72 X |
| 3,011,910 | 12/1961 | Hagan et al. | 117—73 |
| 3,022,653 | 2/1962 | Baird | 117—94 |
| 3,113,883 | 12/1963 | James | 117—94 |
| 3,211,808 | 10/1965 | Young et al. | 117—124 X |
| 3,234,042 | 2/1966 | Marzocchi et al. | 117—124 X |
| 3,241,518 | 3/1966 | Johnson | 117—124 X |

WILLIAM D. MARTIN, *Primary Examiner.*

R. HUSACK, *Assistant Examiner.*

U.S. Cl. X.R.

117—124, 21, 161, 94, 17